United States Patent
Haley

[11] Patent Number: 6,034,614
[45] Date of Patent: Mar. 7, 2000

[54] SEISMICALLY ACTIVATED APPARATUS

[76] Inventor: Chester M. Haley, 34892 Rancho Vista Dr., Cathedral City, Calif. 92234

[21] Appl. No.: 09/066,719

[22] Filed: Apr. 23, 1998

Related U.S. Application Data

[63] Continuation-in-part of application No. 08/799,134, Feb. 13, 1997, abandoned.
[51] Int. Cl.$^7$ ...................................................... G08B 21/00
[52] U.S. Cl. .................. 340/690; 340/689; 200/61.45 R; 200/61.52
[58] Field of Search ..................................... 340/690, 689, 340/601, 687; 200/61.45 R, 61.52

[56] References Cited

U.S. PATENT DOCUMENTS

| | | | |
|---|---|---|---|
| 4,297,690 | 10/1981 | Baker | 340/690 |
| 4,353,383 | 10/1982 | Kiesel | 137/45 |
| 4,679,033 | 7/1987 | Hwang | 340/689 |
| 4,945,347 | 7/1990 | Perry | 340/690 |
| 5,278,540 | 1/1994 | Caban-Domenech | 340/690 |
| 5,307,054 | 4/1994 | Concannon et al. | 340/690 |
| 5,418,523 | 5/1995 | Anderson et al. | 340/690 |
| 5,473,307 | 12/1995 | Lam | 340/467 |
| 5,539,387 | 7/1996 | Gitlis et al. | 340/690 |
| 5,633,463 | 5/1997 | Szasz | 340/690 |

*Primary Examiner*—Jeffery A. Hofsass
*Assistant Examiner*—Anh La
*Attorney, Agent, or Firm*—Roy A. Ekstrand

[57] ABSTRACT

A multi-cell battery power pack for use in a battery-powered appliance such as a lantern or the like supports a plurality of conventional battery cells together with a seismically activated switch to provide a seismically activated apparatus. The seismic switch includes a spring rod and an elongated cylindrical rod suspending a contact weight within a contact ring such that the contact ring encircles a portion of the contact weight. A silicon controlled rectifier is operatively coupled to the contact weight and the contact ring as well as the batteries of the power pack to provide silicon controlled rectifier activation in response to sufficient seismic activity. In an alternate embodiment, a cylindrical housing is configured to correspond to a conventional battery cell and supports a positive and negative terminal at its opposed ends. Within the housing, a spring rod and elongated cylindrical rod support the contact weight within the contact ring which operate together with an associated silicon controlled rectifier to facilitate seismic response. The resulting device replaces a conventional cell within a battery power pack to convert a conventional power pack to a seismically responsive power pack. In a still further alternate embodiment, a coil spring supports the contact weight and a timer responsive to the seismic switch controls the relay.

14 Claims, 7 Drawing Sheets

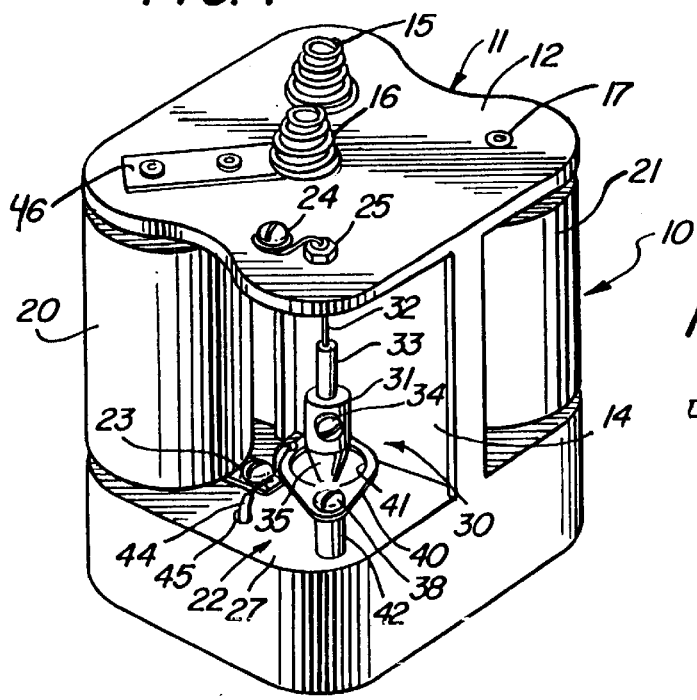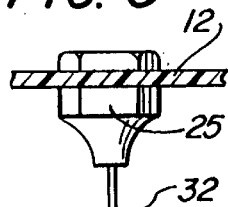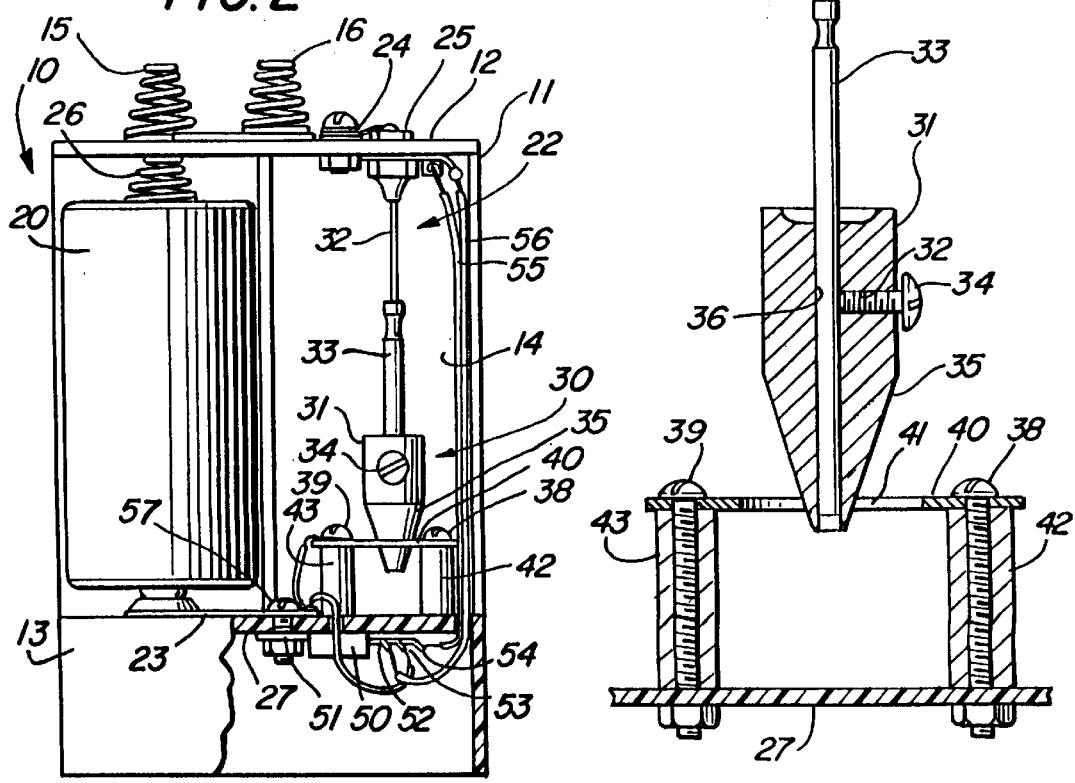

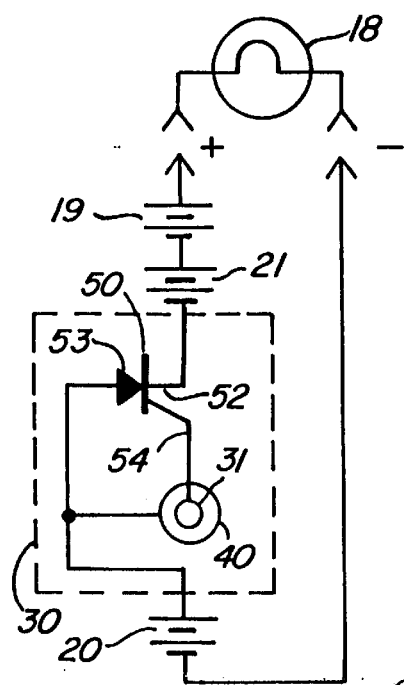
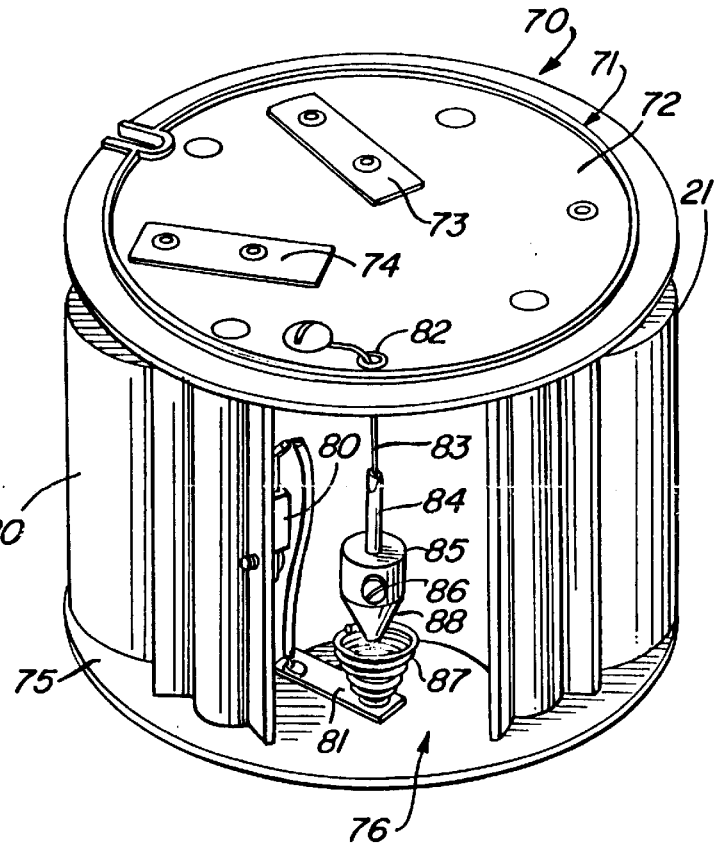
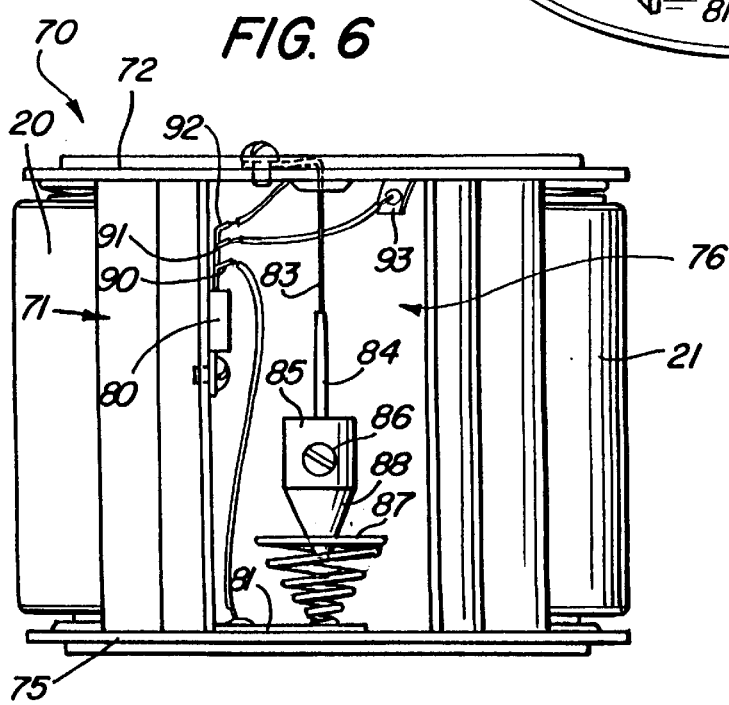
FIG. 4
FIG. 5
FIG. 6

SEISMICALLY ACTIVATED APPARATUS

CROSS-REFERENCE TO RELATED PATENT AND PATENT APPLICATION

This application is a continuation-in-part of a application Ser. No. 08/799,134 entitled SEISMICALLY ACTIVATED APPARATUS which was filed Feb. 13, 1997 now abandoned in the name of the Applicant and is also related to U.S. Pat. No. 5,596,183 entitled Seismically Activated Appliance Switch, filed Oct. 18, 1995 on behalf of the Applicant of this application which issued on Jan. 21, 1997.

FIELD OF THE INVENTION

This invention relates generally to seismically activated light systems and particularly to seismically activated switches used in battery-operated appliances.

BACKGROUND OF THE INVENTION

In many areas of the world, seismic activity, such as earthquakes, presents a substantial risk to inhabitants of such areas. While low level seismic activity is virtually continuous over the earth surface, major earthquakes often cause great human injury and property damage. Despite great advances in other sciences, the science of geology has yet to produce an effective method by which geologists can predict the locations and times of occurrences of earthquakes. As a result, the typical earthquake occurs suddenly and unexpectedly and, for the most part, takes the victims by surprise.

The sudden, unexpected and often violent character of earthquakes causes substantial fear among many persons living in so-called earthquake prone areas. In fact, the fear of earthquakes exceeds the actual danger or risk in many instances. Earthquakes occurring at night are particularly frightening. Most people subjected to a nighttime earthquake find themselves jolted from a sound sleep into the terror of a violently shaking dwelling and confusing noises such as items being toppled or broken all around them. Such persons often become panicked or frantic as they stumble about in the dark groping for light switches and/or phones to summon help or get information.

In response to these problems, practitioners in the art have endeavored to provide various seismically responsive safety lights or alarm systems. For example, U.S. Pat. No. 5,307,054 issued to Concannon, Sr., et al. sets forth a motion sensor circuit controller having a ring-shaped first conductor, a second conductor defining a concave conductive surface, a base for supporting the first conductor horizontally oriented above the second conductor with the first and second conductors being connected within a circuit. A conductive ball rollably contacts the second conductor and makes electrical contact between the first and second conductors in response to lateral movement of the conductor. The electrical contact between first and second conductors is used to operate various devices such as a battery-power flashlight or the like. This system is subject to several substantial limitations rendering impractical aspects when considered in a practical manufacturing environment. For example, the unit must be disassembled and other combinations of the ball 16, the inside diameter of ring 18 and the concavity of the screen 42 can be selected for producing the same sensitivity or other desired sensitivities. Further, the triggering of the alarm or light requires that four electrical contacts be completed. The system is extremely demanding on contact actuation and thus high cost gold plated contacts are required. Also, the units shown in this patent are not suitable for use in installations such as wall-mounted or the like.

U.S. Pat. No. 4,359,722 issued to Valdez, et al. sets forth a EARTHQUAKE DETECTION SYSTEM WITH PENDULUM SWITCH having a suspended pendulum which at its lower end has an electric contact space from a stationary ring-shaped contact which surrounds the pendulum contact. During an earth tremor, the stationary contact moves in response to earth motion thereby engaging the suspended pendulum contact and accordingly closing an electric circuit with audible alarm.

U.S. Pat. No. 4,353,383 issued to Kiesel sets forth a SEISMICALLY ACTUATED VALVE RELEASE STRUCTURE for automatically closing or opening a valve upon the occurrence of an earthquake. The release mechanism includes a pendulum which is biased upwardly against stop means formed for pivotal contact with an upper end of the pendulum. The stop means and the upper end have relatively small contact area. Biasing means urge a closure member within the valve toward an open or closed position and the closure member is releasibly retained against the urging of the biasing means by a latch.

U.S. Pat. No. 4,585,358 issued to Shay sets forth a SHAKEABLE SHUT-OFF ALARM CLOCK having a standard alarm configured to be silenced by lateral shaking of the clock. The silencing mechanism includes a laterally shakeable switch responsive to clock motion.

U.S. Pat. No. 5,307,699 issued to Engdahl, et al. sets forth a SEISMIC INITIATOR FOR EARTHQUAKE SHUT-OFF VALVES AND THE LIKE having an acceleration responsive magnet device for closing a valve or operating a switch or the like in response to a disturbance such as an earthquake. A pendulum operates to increase the length of a magnetic path releasing a magnetic element to perform the desired actuation.

U.S. Pat. No. 5,278,540 issued to Caban-Domenech sets forth an ELECTROMECHANICAL EARTHQUAKE ALARM having an earthquake sensor in which a weight falls from a support surface and activates a switch in the event of an earthquake. The support surface is preferably a bell with its open end oriented downward and the weight resting on a concave recessed region at the closed end of the bell.

U.S. Pat. No. 4,103,697 issued to Kiesow sets forth a SAFETY SENSOR DEVICE for automatically shutting off the flow of fluids such as water, gas, oil or steam or for shutting off electric power or actuating an alarm in the event of an earthquake. The device includes a spring-loaded shutoff member normally held in a retracted position by a latch. A pendulum is connected to the latch such that upon the occurrence of an earthquake, movement of the pendulum occurs releasing the latch.

While the foregoing prior art devices have improved the art and, in some instances, enjoyed commercial success, they have failed to provide a seismically activated switch which is suitable for use in attachment to a structure wall. For the most part, such prior art devices have lacked sufficient sensitivity in all force directions. Thus, there remains nonetheless a continuing need in the art for evermore effective reliable, simple to operate seismically activated appliance switching apparatus.

SUMMARY OF THE INVENTION

Accordingly, it is a general object of the present invention to provide an improved seismically activated apparatus which is particularly well-suited to use with battery-powered appliances. It is a more particular object of the present invention to provide an improved seismically activated apparatus having a reliable actuation mechanism which is simple to use and which is easily adjusted to a desired seismic activity trigger level. It is a still particular object of the present invention to provide an improved seismically activated apparatus which utilizes an improved trigger mechanism within a cooperating electrical circuit and which may be easily added to a conventional battery power supply.

The present invention overcomes the limitations of the prior art devices. In accordance with the present invention, there is provided for use in a battery-powered apparatus having means for receiving a plurality of batteries and an electrically powered device, a seismically activated apparatus comprising: a housing for supporting and electrically connecting the plurality of batteries; a seismic switch having a contact weight, a contact ring defining an aperture and a spring rod and an elongated cylindrical rod resiliently supporting the contact weight within the aperture; and a silicon controlled rectifier having an anode and a cathode connected in series with the batteries and a gate electrode coupled to the contact weight of the seismic switch. The position of the contact weight upon its supporting elongated cylindrical rod is adjustable to set the switch sensitivity.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a seismically activated apparatus constructed in accordance with the present invention;

FIG. 2 sets forth a partial section view of the seismically activated apparatus of FIG. 1;

FIG. 3 sets forth a section view of the seismically reactive switch portion of the present invention apparatus;

FIG. 4 sets forth a schematic diagram of the present invention seismically activated apparatus inserted within a battery power supply;

FIG. 5 sets forth a perspective view of an alternate embodiment of the present invention seismically activated apparatus;

FIG. 6 sets forth a side elevation view of the seismically activated apparatus of FIG. 5;

DESCRIPTION OF THE PREFERRED EMBODIMENTS

Figure 7:
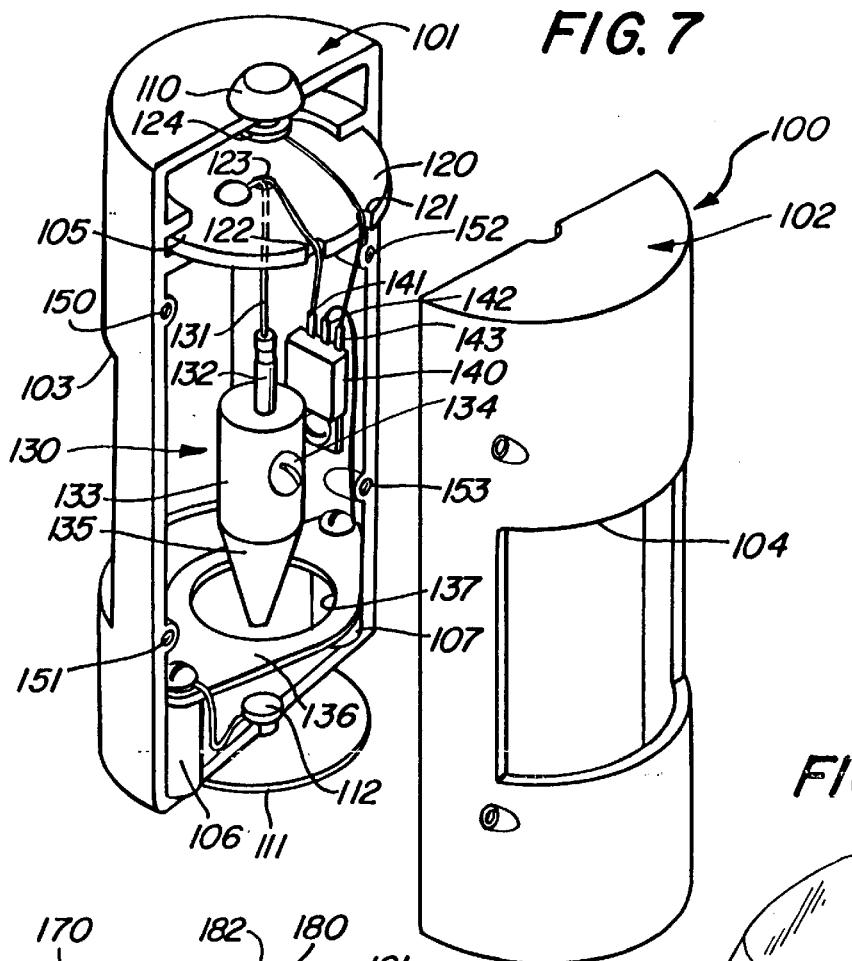
FIG. 7 sets forth a perspective assembly view of a further alternate embodiment of the present invention seismically activated device.

FIG. 1 sets forth a perspective view of a seismically activated apparatus constructed in accordance with the present invention and generally referenced by numeral 10. Apparatus 10 includes a housing 11 preferably formed of a molded plastic material or the like defining a generally rectangular shape and having a top surface 12 and a base 13. A vertical wall 14 extends upwardly from base 13 to support top surface 12. Base 13 in turn defines a bottom surface 27. Housing 11 is configured generally to receive four standard cylindrical batteries such as batteries 20, 21 and a third battery 22 (not seen). In addition, housing 11 defines a space 22 which, in the prior art configuration of housing 11, would receive and support a fourth cylindrical battery. In accordance with the present invention, however, space 22 is utilized to house and support a seismic reactive switch generally referenced by numeral 30.

Within space 22, a contact ring 40 is supported upon bottom surface 27 by a pair of posts 42 and 43. Contact ring 40 is secured by a pair of conventional fasteners 38 and 39 (the latter seen in FIG. 2). Contact ring 40 defines a center aperture 41. A contact strip 23 extends between space 22 and the positive contact of battery 20 in the manner shown in FIG. 2. A connecting wire is coupled between contact 23 and contact ring 40. An additional connecting wire 44 is joined to contact 23 and passes through an aperture 45 formed in bottom surface 27 of housing 11. As is set forth below in greater detail, connecting wire 44 provides electrical connection to silicon controlled rectifier 50.

Switch 30 further includes a guide 25 supported within top surface 12 having a center aperture through which a spring rod 32 extends. Guide 25 and spring rod 32 are electrically coupled to a contact and fastener 24. Spring rod 32 further supports a downwardly extending cylindrical rod 33 upon which a contact weight 31 is supported in the manner better seen in FIGS. 2 and 3. Suffice it to note here that contact weight 31 is movable upon rod 33 and secured at the desired position by fastener 34. Contact weight 31 further defines a tapered portion 35 which extends through aperture 41 of contact ring 40.

Apparatus 10 further includes a pair of spring contacts 15 and 16 which cooperate with a plurality of conventional connecting strips and the like to provide series connection between batteries 19, 20 and 21 (seen in FIG. 4) and seismic reactive switch 30. Thus, it will be understood that such electrical connecting devices including rivet 17, contact strip 46 and contact strip 23 all seen in FIG. 1 are operative to provide series connection between batteries 19 through 21 and switch 30 in the manner shown in the schematic diagram of FIG. 4.

The resulting structure formed by housing 11 together with batteries 19 through 21 and seismic switch 30 provides a replaceable unit which fits directly within a standard battery-operated device such as a lantern or the like which utilizes a battery package having housing 11 and for standard cylindrical batteries such as D cells or the like. As will be apparent to those skilled in the art by examination of FIG. 1, the present invention makes use of such a replaceable housing to substitute seismic switch 30 for one of the batteries and to provide appropriate electrical connections to form the series combination of three batteries and a seismically reactive switch apparatus for powering a conventional lamp or the like.

FIG. 2 sets forth a partial section side view of apparatus 10 having base 13 shown in partial section view to facilitate illustration of the silicon controlled rectifier switching system of the present invention seismically activated apparatus. As described above, apparatus 10 includes a housing 11 having a top surface 12 and a base 13. A vertical wall 14 extends upwardly from bottom surface 27 to support top surface 12. As is also described above, housing 11 supports a pair of spring contacts 15 and 16. A plurality of batteries such as battery 20 are received within housing 11 and supported therein by a spring contact 26 on the upper surface thereof and a contact 23 on the lower end of battery 20. As described above, an additional pair of conventional batteries 19 and 21 are further supported within housing 11. Contact strip 23 is supported upon bottom surface 27 and receives the positive contact terminal of battery 20 while spring contact 26 captivates battery 20 within housing 11 and provides a negative contact connection for battery 20.

In accordance with the present invention, space 22 between top surface 12 and bottom surface 27 supports seismic reactive switch mechanism 30. A guide 25 extends through an aperture (not shown) formed in top surface 12 and secures a downwardly extending spring rod 32. Guide 25 electrically connects spring rod 32 to contact and fastener 24. An elongated cylindrical rod 33 is secured to and supported by spring rod 32 extending downwardly within space 22. Seismic switch 30 further includes a contact weight 31 formed of a heavy metal material such as brass or the like which supports a fastener 34. As is better seen in FIG. 3, contact weight 31 defines a center bore 36 extending therethrough which receives rod 33. Contact weight 31 further defines a tapered surface 35 at the lower end thereof. A contact ring 40 defines an aperture 41 (seen in FIG. 1) and is supported above bottom surface 27 by a pair of posts 42 and 43 together with conventional fasteners 38 and 39 respectively. Tapered portion 35 extends through aperture 41 of contact ring 40.

Seismic reactive switch 30 further includes a silicon controlled rectifier 50 having a heat sync 51 which is secured to the underside of bottom surface 27 by a conventional fastener 57. Fastener 57 also passes through an aperture (not shown) formed in contact strip 23. Silicon controlled rectifier 50 is a conventional silicon controlled rectifier having a cathode 52, an anode 53 and a gate 54. The circuit configuration of silicon controlled rectifier 50 is shown in the schematic diagram of FIG. 4. Electrical connection to cathode 52, anode 53 and gate 54 to provide the schematic arrangement is provided by conventional connecting wires such as wires 55 and 56.

In operation, the series coupling of batteries 19 through 21 (seen in FIG. 4) together with the switch portion of seismic switch 30 maintains an open circuit condition for each of the batteries 19 through 21 so long as contact weight 31 remains suspended within aperture 41 of contact ring 40. Thus, in the absence of contact between contact weight 31 and contact ring 40, silicon controlled rectifier 50 remains nonconductive and the open circuit configuration of the battery power supply of apparatus 10 remains inactive.

In response to seismic activity and corresponding motion forces applied to the battery-powered apparatus which receives and supports apparatus 10, the position of contact weight 31 is disturbed and spring rod 32 is flexed. As contact weight 31 continues to swing and oscillate in response to seismic forces imparted to apparatus 10, one of two conditions results. In the first condition in which the seismic activity is insufficient to cause contact weight 31 to swing into contact with ring 40, silicon controlled rectifier 50 remains open circuit and the battery-powered device operated by apparatus remains inactive or off. In the second situation, sufficient seismic energy is released and contact weight 31 is disturbed to an extent causing contact between tapered portion 35 and ring 40. As is set forth below in FIG. 4 in greater detail, the momentary electrical contact between contact weight 31 and contact ring 40 triggers silicon controlled rectifier 50 causing conduction of silicon controlled rectifier 50 and completing the battery power circuit of apparatus 10. Once silicon controlled rectifier 50 is triggered, further contact between contact weight 31 and contact ring 40 is not required to maintain the conduction of silicon controlled rectifier 50. As a result, the seismic energy imparted to apparatus 10 produces conduction of the battery power supply within the apparatus and the device which apparatus 10 powers becomes active. In the most likely utilization of apparatus 10, a battery-powered lantern is activated causing a seismically reactive light to be produced.

The sensitivity of seismic switch 30 is adjusted by varying the position of contact weight 31 upon rod 33 which in turn varies the position of tapered portion 35 within aperture 41 of ring 40. With contact weight 31 raised, a smaller diameter portion of contact weight 31 is positioned within the plane of ring 40 and the sensitivity of switch 30 is reduced. Conversely, with contact weight 31 lowered, a larger diameter portion of contact weight 31 is positioned within aperture 41 of contact ring 40 increasing the sensitivity of the seismic switch.

FIG. 3 sets forth a partial section view of the operative mechanism of contact weight 31 and its support apparatus together with contact ring 40 and its support apparatus. A guide 25 is secured to top surface 12 and receives and supports a spring rod 32 which in turn supports an elongated cylindrical rod 33. A contact weight 31 defines a center bore 36 which receives rod 33. In the preferred fabrication of the present invention, rod 33 is of sufficient length to extend through center bore 36 and downwardly just below contact ring 40 into aperture 41 therein. Contact weight 31 further defines a threaded bore 32 which communicates with center bore 36 and receives a conventional threaded fastener 34. Contact weight 31 also defines a tapered portion 35 on the lower end thereof. A pair of cylindrical posts 43 extend upwardly from bottom surface 12 of housing 11 and receive conventional fasteners 38 and 39. A contact ring 40 defining an aperture 41 is secured upon posts 42 and 43 above bottom surface 27.

As can be seen, the position of contact weight 31 with respect to contact ring 40 is adjustable by moving contact weight 31 upwardly or downwardly upon rod 33. The raised position of contact weight 31 places a small diameter portion of taper portion 35 within aperture 41 reducing switch sensitivity. Conversely, lowering contact weight 31 with respect to contact ring 40 places a larger diameter portion of taper portion 35 within aperture 41 increasing the sensitivity of the switch. The adjusted position of contact weight 31 upon rod 33 is secured by turning fastener 34 within threaded bore 32 against rod 33.

FIG. 4 sets forth a schematic diagram of the electrical portion of apparatus 10. As described above, the operative environment of apparatus 10 is that of a multiple battery power pack and thus a trio of batteries 19, 20 and 21 are shown in series connection with seismic reactive switch 30. By way of overview, the function of seismic switch 30 essentially configures silicon controlled rectifier 50 to provide a conductive path between batteries 20 and 21 completing the electrical circuit powering lamp 18 when the silicon controlled rectifier is triggered. Conversely, with silicon controlled rectifier 50 in open circuit condition, the conduction of batteries 19 through 21 is correspondingly open circuited and lamp 18 is not powered. Thus, silicon controlled rectifier 50 includes a cathode 52 coupled to the negative side of battery 21 and an anode 53 coupled to the positive side of battery 20. Silicon controlled rectifier 50 further includes a gate electrode 54 coupled to contact weight 31 of seismic switch 30. Anode 53 of silicon controlled rectifier 50 is further coupled to contact ring 40.

In operation, so long as contact weight 31 does not contact contact ring 40, gate electrode 54 of silicon controlled rectifier 50 remains decoupled from battery 20 and silicon controlled rectifier 50 remains open circuit or nonconductive. Once contact weight 31 is disturbed sufficiently to cause electrical contact between contact weight 31 and contact ring 40, gate 54 is momentarily coupled to the positive terminal of battery 20 providing a trigger voltage which causes silicon controlled rectifier 50 to begin conduction. Once silicon controlled rectifier 50 begins conduction, the series coupling of batteries 20 and 21 is completed and bulb 18 is energized. The conductive state of silicon controlled rectifier 50 continues once the silicon controlled rectifier has been triggered notwithstanding the interruption of contact between contact weight 31 and contact ring 40. Of importance with respect to the present invention is the provision of a replaceable battery pack within which a seismically reactive switch section is provided in place of a conventional battery to convert a conventional battery pack to a seismically reactive power source for a lamp or lantern as well as virtually any other battery powered device.

FIG. 5 sets forth a perspective view of an alternate embodiment of the present invention seismically activated apparatus generally referenced by numeral 70. By way of overview, apparatus 70 shown in FIGS. 5 and 6 is substantially the same in its operation and theory of operation as apparatus 10 shown in FIGS. 1 through 3. The major differences between apparatus 70 and apparatus 10 is found in the use of a round housing 71 in apparatus 70 rather than a rectangular housing 11 used in apparatus 10. The additional major difference between apparatus 70 and apparatus 10 is found in the use of a conical spring contact 87 which replaces contact ring 40 and posts 42 and 43 in apparatus 10 shown in FIGS. 1 through 3. In virtually all other respects, however, the operation of apparatus 70 is substantially identical to the operation of apparatus 10. Apparatus 70 is also utilized in a conventional multibattery power pack environment which is inserted into a battery-powered device such as a lantern or the like. As a result, the replacement of a conventional battery pack apparatus with apparatus 70 provides the above-described benefits of seismic reaction and operation. Thus, apparatus 70 includes a cylindrical housing 71 having a top surface 72 and a bottom surface 75. A multiply curved set of vertical walls extend between bottom surface 75 and top surface 72 to form a rigid support. Top surface 72 supports a plurality of electrical contacts including contact strips 73 and 74. Similarly, bottom surface 75 supports a plurality of electrical contacts such as contact strip 81. Housing 71 receives and supports a trio of batteries 20 and 21 together with battery 19 (seen in FIG. 4). In addition, housing 71 defines a space 76 within which a conical contact spring 87 is supported upon a contact strip 81. Also supported within space 76 is a silicon controlled rectifier 80. Apparatus 70 further includes a guide 82 receiving a spring rod 83 which further supports an elongated cylindrical rod 84. A contact weight 85 is movable upon rod 84 and secured at a desired position by a fastener 86. Contact weight 85 further includes a tapered portion 88 which extends downwardly into the interior of spring contact 87. Silicon controlled rectifier 80 is operatively coupled to batteries 20 and 21 as well as the seismic switch provided by contact weight 85 and spring contact 87 in the same manner as shown in FIG. 4. Thus, apparatus 70 defines the same electrical circuit as shown in FIG. 4 in which apparatus 70 replaces apparatus 30 and silicon controlled rectifier 80 replaces silicon controlled rectifier 50. Further, contact weight 85 replaces contact weight 31 and spring contact 87 replaces contact ring 40. The operation of apparatus 70, however, is substantially identical to the operation described above.

FIG. 6 sets forth a side elevation view of apparatus 70 showing housing 71 having a top surface 72 and a bottom surface 75 and supporting conventional batteries 20 and 21. Housing 72 defines space 76 within which contact weight 85 and rod 84 are supported by spring rod 83. Also shown within space 76 is spring contact 87. Silicon controlled rectifier 80 is secured to a sidewall of space 76 and includes a cathode 90 coupled to connecting strip 81, an anode 91 coupled to a battery terminal connecting strip 93, and a gate 92 coupled to guide 82 and spring rod 83.

In operation, seismic forces imparted to apparatus 70 disturbed the position of contact weight 85 within spring contact 87. Once contact weight 85 contacts spring 87, the gate circuit of silicon controlled rectifier 80 is completed and silicon controlled rectifier 80 becomes conductive producing electrical connection between batteries 20 and 21 and activating the battery-powered device within which apparatus 70 is received.

FIG. 7 sets forth a perspective assembly view of a still further alternate embodiment of the present invention seismically activated apparatus generally referenced by numeral 100. By way of overview, apparatus 100 includes a seismic switch 130 supported within a generally cylindrical housing formed of half portions 101 and 102. Apparatus 100 provides a seismically responsive element which is configured in general correspondence to a conventional cylindrical battery such as a D-cell and which is, as a result, receivable within a battery-powered device in direct replacement of a standard cell. The operation of seismic switch 130 corresponds directly to the operation of seismic switch 30 in apparatus 10 shown in FIGS. 1 through 3. The advantage of apparatus 100 is the ability of the user to configure virtually any battery-powered appliance or device into a seismically reactive device by simply replacing one standard cell within the battery pack of the device with apparatus 100.

More specifically, apparatus 100 includes a pair of semi-cylindrical housing portions 101 and 102 which are secured together using a plurality of conventional fasteners (not shown). Housing portion 101 supports a positive battery terminal 110 on the upper end thereof and a negative battery terminal 111 at the lower end thereof. The latter is supported using a conductive head 112 while the former is secured using a spring contact 124. Housing portion 101 further defines a generally rectangular window 103 and a pair of support posts 106 and 107. Post 106 and 107 in turn support a contact ring 136 having an aperture 137 formed therein. Contact ring 136 is coupled to negative terminal 111 by a conventional wire coupling. Housing half portion 101 further defines a groove 105 which receives a generally disk-shaped conductive metal plate 120. Plate 120 further defines an aperture 123 and a pair of notches 121 and 122. A spring rod 131 passes through aperture 123 and is connected to plate 120 using a conventional fastener. The lower end of spring rod 131 is secured to an elongated cylindrical rod 132 which in turn supports a contact weight 133. Contact weight 133 supports a fastener 134 and defines a tapered lower portion 135.

Seismic switch 130 further includes a silicon controlled rectifier 140 having a cathode 143 coupled to spring 124 and positive terminal 110, an anode 142 coupled to contact ring 136, and a gate electrode 141 coupled to spring rod 131. Housing half portion 101 further includes a plurality of interior bosses 150, 151, 152 and 153 which receive fasteners to secure half portion 102 to half portion 101.

Housing portion 102 is a substantial mirror image of portion 101 and thus defines a generally semicylindrical shape having a rectangular window 104 formed therein. Apparatus 100 is assembled by assembling seismic switch 130 within half portion 101 as shown and thereafter securing half portions 101 and 102 together using conventional fasteners. Alternatively, adhesive attachment may be used to secure half portions 101 or 102 as well as virtually any other attachment mechanism. Once apparatus 100 is assembled, the position of contact weight 133 upon rod 132 is adjusted by loosening fastener 134 and moving contact weight 133 to the desired position to achieve the desired sensitivity. During this adjustment process, windows 103 and 104 facilitate the movement and adjustment of contact weight 133.

Once apparatus 100 is completely assembled, it may be utilized by simply replacing a corresponding sized conventional battery cell with apparatus 100 in a series connected battery-powered pack of the type described above. The result is a seismically responsive apparatus with little or no alteration of the device. In such use, it may be desirable to change the power utilization portion of the apparatus to suit the change in battery power. For example, in a four-cell battery pack in which apparatus 100 replaces one of the cells, it may be desirable to replace the lamp or other device within a lantern to conform to the reduced voltage provided.

Figure 8:
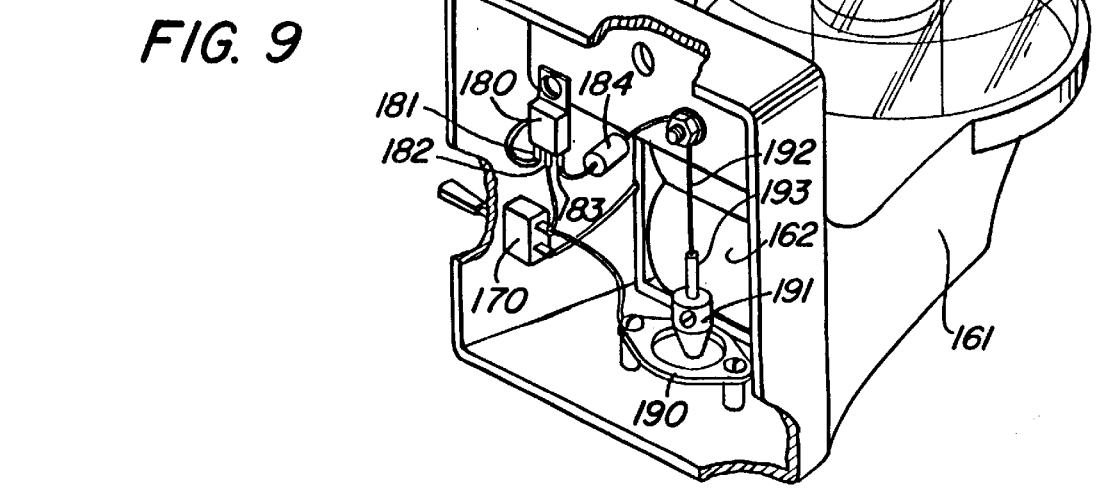
FIG. 8 sets forth a perspective view of a still further alternate embodiment of the present invention seismically activated apparatus.

FIG. 8 sets forth a rear perspective view of a still further alternate embodiment of the present invention seismically activated apparatus generally referenced by numeral 160. Apparatus 160 includes a housing 161 which is configured to provide attachment of apparatus 160 to a vertical wall surface or other similar surface in the same manner as a conventional wall mounted lamp or lantern. Apparatus 160 includes a lamp 163 together with a plurality of batteries 162 supported within housing 161. The operation of apparatus is substantially the same as that described above with the addition of an on/off switch 170. Thus, apparatus 160 includes a contact weight 191 supported by a rod 193 which in turn is supported by a spring rod 192. The latter is secured to the interior surface of housing 161. A contact ring 190 is supported within housing 161 by a pair of posts and in the manner described above defines a center aperture through which contact weight 191 extends. A silicon controlled rectifier 180 is secured within housing 161 and includes a cathode 181, an anode 182 and a gate electrode 183. Gate 183 is coupled to spring rod 192 by a resistor 184. An on/off switch 170 is secured within housing 161. Switch 170 is coupled to a positive terminal of battery 162 and is further coupled to contact ring 190 and anode electrode 182 of silicon controlled rectifier 180. Cathode electrode 181 of silicon controlled rectifier 180 is coupled to lamp 163 by conventional wiring (not shown).

The operation of apparatus 160 is substantially the same as that set forth above in apparatus 10 and apparatus 100 in that the apparatus response to seismic energy and its displacement of contact weight 191 within contact ring 190 to trigger silicon controlled rectifier 180 and provide power coupling between batteries 162 and lamp 163. In addition, switch 170 provides an on/off capability in which apparatus 160 may be suspended from operation by simply moving switch 170 to the open position.

Figure 9:
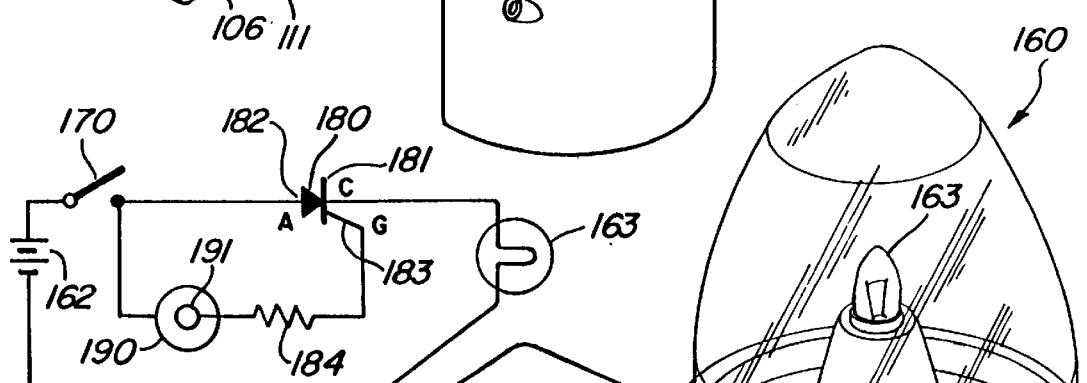
FIG. 9 sets forth a schematic diagram of the alternate embodiment of the present invention apparatus shown in FIG. 8.

FIG. 9 sets forth a schematic diagram of apparatus 160. A battery 162 which may comprise one or more battery cells in combination is coupled to an on/off switch 170. A silicon controlled rectifier 180 includes an anode 182 coupled to the remaining terminal of switch 170 and a cathode 181 coupled to lamp 163. The remaining side of lamp 163 is coupled to the negative terminal of battery 162. Silicon controlled rectifier 180 includes a gate electrode 183 coupled to contact weight 191 by a resistor 184. Resistor 184 is selected in accordance with battery voltage and is sufficient in resistance to protect gate electrode 183. It should be noted that the embodiment of FIGS. 8 and 9 utilize resistor 184 when the total battery voltage is six volts or greater. In the remaining embodiments of the invention in which a battery supply of less than six volts is used, the gate resistor (resistor 184) is omitted. Contact ring 190 is further coupled to one side of switch 170.

In operation, with switch 170 in the open position shown, battery 162 is isolated from silicon controlled rectifier 180 and lamp 163. Thus, despite seismic activity causing electrical contact between contact weight 191 and contact ring 190, silicon controlled rectifier 180 remains nonconductive and lamp 163 is not energized. With switch 170 closed, however, a positive battery voltage is applied to anode 182 of silicon controlled rectifier 180 as well as contact ring 190. In this event, the occurrence of seismic energy sufficient to cause contact weight 191 to contact ring 190 provides a trigger voltage at gate electrode 183 turning on silicon controlled rectifier 180 and allowing power to flow from battery 162 to lamp 163 energizing the lamp.

In accordance with an important aspect of the present invention, the seismic switch may operate in an inverted position with equal effectiveness. Thus if the inventive device is used in a lantern of the type manufactured by EverReady under the product name EverReady Sports Gear 2 Way Lantern, it will operate inverted when the lantern is operated as a 360 degree area illuminator.

Figure 10:
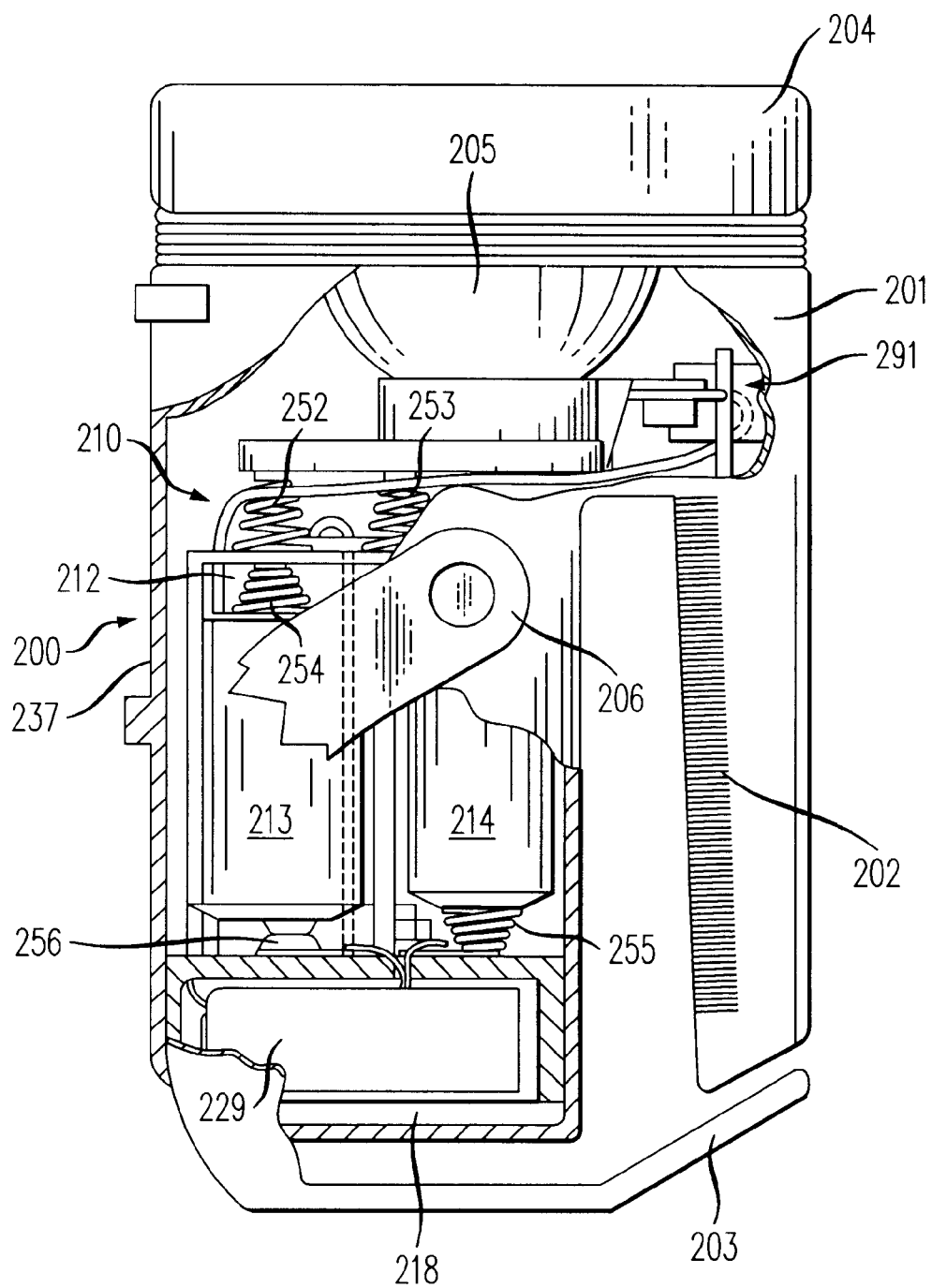
FIG. 10 sets forth a partially sectioned side view of an alternate embodiment of the present invention apparatus.

FIG. 10 sets forth a partially sectioned side elevation view of a seismically activated apparatus constructed in accordance with the present invention and generally referenced by numeral 200. Apparatus 200 provides a battery powered lamp having a battery pack generally referenced by numeral 210 received within a housing 201. Housing 201 further supports a threaded removable lamp collar 204 which, in accordance with conventional fabrication techniques, supports a clear glass faceplate (not shown) and a reflector 205. Also not shown in FIG. 10 is a conventional electric lamp supported within reflector 205 in further accordance with conventional fabrication techniques. As is better seen in FIG. 12, battery pack 210 further includes a plurality of spring contacts 252 through 255 together with a fixed contact 256 and a fixed contact 257 which cooperate with appropriate wiring and coupling members to provide electrical connection between a plurality of batteries 213 through 216 (seen in FIG. 15) used to power the electric bulb within reflector 205. Apparatus 200 further includes a handle 202 and a base 203 which facilitates convenient manipulation of apparatus 200 as well as the ability to stand apparatus 200 vertically as shown or lie apparatus 200 in a horizontal position.

Figure 11:
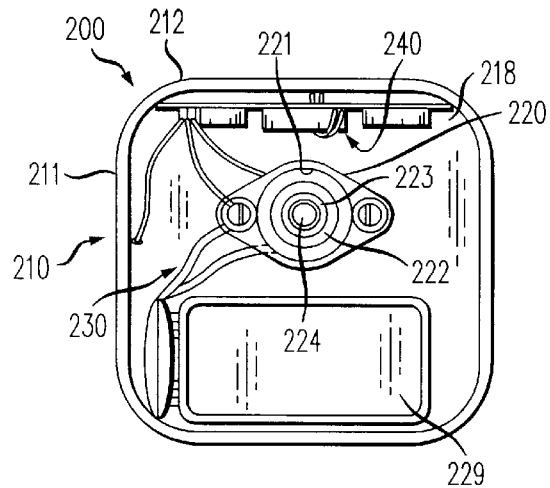
FIG. 11 sets forth a bottom view of the present invention apparatus of FIG. 10.

In accordance with the present invention, a switch 245 accessible from the exterior of housing 201 is electrically coupled to a timer and relay circuit 240 (seen in FIG. 11). A base cavity 218 supports a timer battery 229 which is also electrically coupled to the timer and relay circuit. In further accordance with the present invention, and as is better set forth in FIGS. 11, 12 and 13 below, apparatus 200 further supports a seismic switch generally referenced by numeral 230 which, as is also described above, operates to control the operation of apparatus 200 in various seismically responsive modes.

In further accordance with the present invention and as is also described below in greater detail, apparatus 200 will operate either in the vertical position shown in FIG. 10 or in a fully inverted position with respect thereto. In addition, apparatus 200 when laid upon side 237 of housing 201 operates by means set forth below in greater detail to override the timer and seismic switch operation described below. In further accordance with the present invention described below in greater detail, the timer and relay circuit together with seismic switch cooperate to facilitate the configuring of apparatus 200 into a lamp which responds to vibrations such as occur during seismic activity to activate the lamp under battery power for a predetermined time interval. During this operation, timer and relay circuit 240 having been triggered by seismic switch 230 maintain the activation of the lamp within apparatus 200 for the timer interval without further triggering activity of seismic switch 230 (seen in FIG. 11). At the completion of the timer interval, the timer and relay circuit deactivates the lamp of apparatus 200 to conserve battery power.

FIG. 11 sets forth a bottom view of apparatus 200 showing the support of timer and relay circuit 240 together with seismic switch 230 and timer battery supply 229 within base cavity 218 of battery pack 210.

The configuration of timer and relay circuit 240 is set forth below in FIGS. 14 through 16 in greater detail. However, suffice it to note here that timer and relay circuit 240 is preferably fabricated upon a conventional printed circuit board utilizing standard electronic components and having a plurality of electrical connecting wires operative to provide the necessary electrical coupling for timer and relay circuit 240 to the remainder of the system.

Also described below in greater detail, seismic switch 230 is similar to the above-described seismically activated switches in that it utilizes a contact ring 220 having an aperture 221 formed therein which is supported with respect to housing 212 of battery pack 210. In further similarity to the above-described seismically activated switches, switch 230 includes a contact weight 222 supported within aperture 221. In contrast to the seismic switch structure set forth above, however, seismic switch 230 supports contact weight 222 upon a coil spring rod 223 and further includes a dampening weight 224 therein. The structure of seismic switch 230 is described below in FIG. 13 in greater detail. However, suffice it to note here that contact weight 222 is resiliently supported within aperture 221 by coil spring rod 223 and is normally out of contact with contact ring 220. During seismic vibration, however, the resilience of coil spring rod 223 is overcome at some point and contact weight 222 touches contact ring 220 activating timer and relay circuit 240. The spring characteristic of coil spring rod 223 and its effect upon contact weight 222 is varied by moving dampening weight 224 within coil spring rod 223 as described below. In accordance with a further important aspect of the present invention, battery 229 which may, for example, be a conventional nine volt battery provides separate operating power for timer and relay circuit 240.

Figure 12:
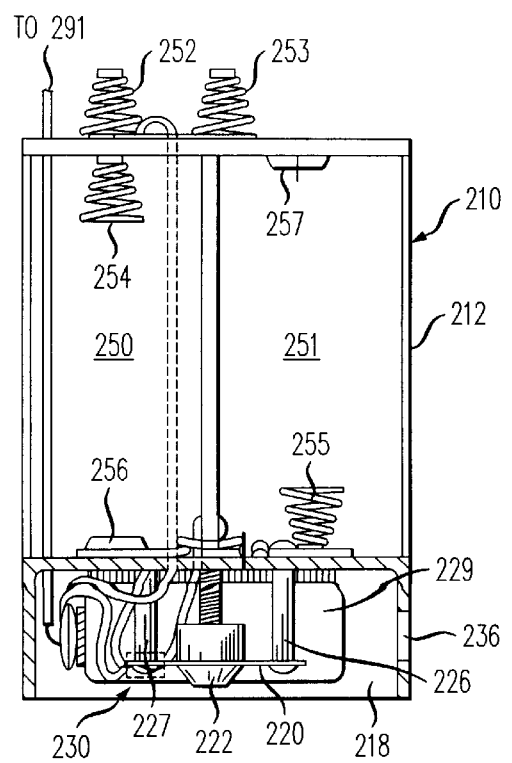
FIG. 12 sets forth a section view of the battery pack portion of the alternate embodiment of the present invention shown in FIG. 10.

FIG. 12 sets forth a section view of battery pack 210 showing housing 212 having battery cavities 250 and 251 together with base cavity 218 formed therein. A plurality of stationary contacts such as contacts 256 and 257 together with spring contacts such as springs 254 and 255 provide electrical connection to batteries 213 through 216 (seen in FIG. 15). As described above in FIG. 13, seismic switch 230 is supported within cavity 218 together with timer battery supply 229. Thus contact ring 220 is supported within cavity 218 by posts 226 and 227 while contact weight 222 is supported within the center aperture of contact ring 220 by coil spring rod 223. Additional spring contacts such as spring contacts 252 and 253 are supported upon housing 212 and provide electrical connection to the lamp supported within reflector 205 (seen in FIG. 10). Of importance to note in FIG. 12 is the structure which supports seismic switch 230 together with timer and relay circuit 240 (seen in FIG. 11) entirely within housing 212 of battery pack 210. As a result, the entire combined apparatus may be removed from apparatus 200 in accordance with its normal fabrication and used in many lanterns of similar design.

Figure 13:
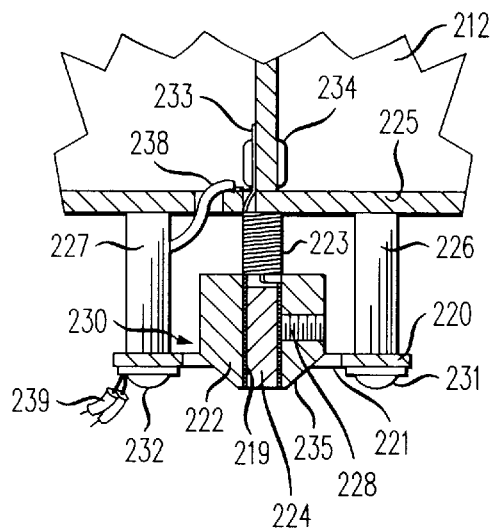
FIG. 13 sets forth a partial section view of the seismic switch portion of the present invention apparatus.

FIG. 13 sets forth a partial section view of the structure of seismic switch 230 supported upon bottom surface 225 of housing 212 within battery pack 210.

More specifically, bottom surface 225 supports a pair of downwardly extending insulative cylindrical posts 226 and 227. A contact ring 220 formed of a metal such as brass or the like is secured to the bottom ends of posts 226 and 227 by a pair of conventional fasteners 231 and 232. A plurality of connecting wires 239 form electrical contacts with contact ring 220 and are further held by fastener 232. Additional electrical connection is provided by connecting wire 238 which is secured by a conventional rivet 234.

A coil spring rod 223 formed of a resilient spring material such as spring steel defines an upper end 233 secured by a rivet 234 and a lower end. In accordance with conventional fabrication techniques, coil spring rod 223 is fabricated of spring steel or the like and is helically wound to form a hollow, generally cylindrical, resilient spring rod. A contact weight 222 preferably formed of a heavy electrically conductive metal such as brass or the like defines a tapered frusto-conical surface 235 and a center bore 219. Bore 219 receives the lower end of coil spring 223. A set screw 228 is threadably received within a passage formed in contact weight 222 and operates to secure contact weight 222 upon the lower end of coil spring rod 223 at the desired operating position. In further accordance with the present invention, a dampening weight 224 is received within the interior of coil spring rod 223 and secured therein by the force of set screw 228.

In operation, seismic disturbances produce sufficient vibration to overcome the resilience of coil spring rod 223 and in a manner similar to the above-described embodiments, allow contact weight 222 to touch contact ring 220 of seismic switch 230 triggering the operation of timer and relay circuit 240 described below. In further accordance with the present invention, the operating characteristics of switch 230 may be varied by adjusting the position of contact weight 222 upon coil spring rod 223 and by adjusting the relative position of dampening weight 224 within the coil spring rod. It will be apparent to those skilled in the art that the structure of FIG. 13 may be completely inverted and will continue to function in its intended manner. As mentioned above, the operation of the timer and relay circuit of the present invention apparatus may be overridden by simply orienting apparatus 200 (seen in FIG. 10) in a horizontal position. When so positioned, the weight of contact weight 222 bends coil spring rod 223 allowing the contact weight 222 to rest upon contact ring 220. This maintains connection of seismic switch 230 and has the effect of overriding timer operation.

Figure 14:
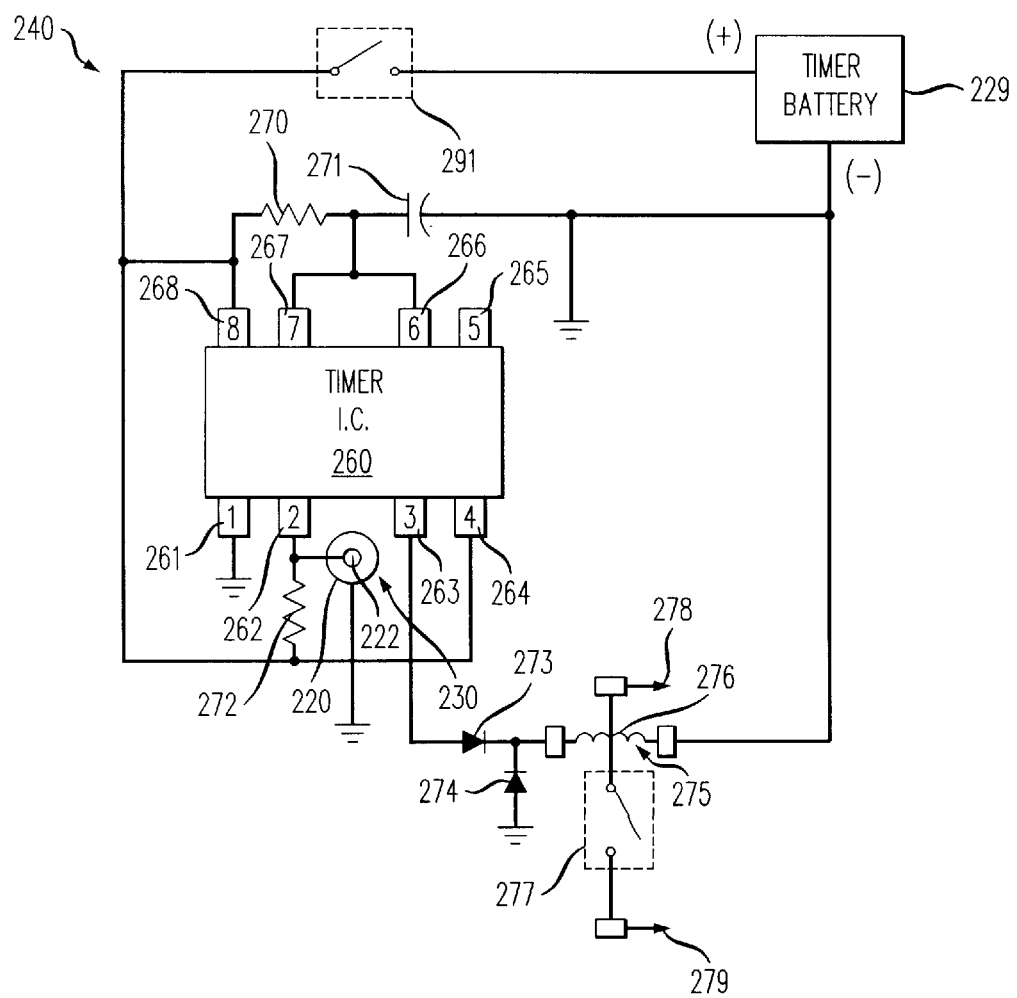
FIG. 14 sets forth a schematic diagram of the timer end relay circuit of the present invention apparatus.
Figure 15:
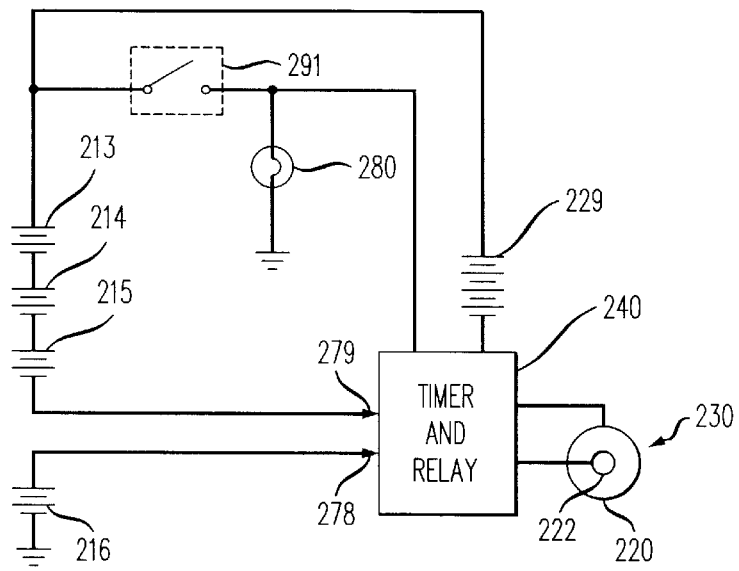
FIG. 15 sets forth a schematic diagram of an electrical circuit of the present invention apparatus.
Figure 16:
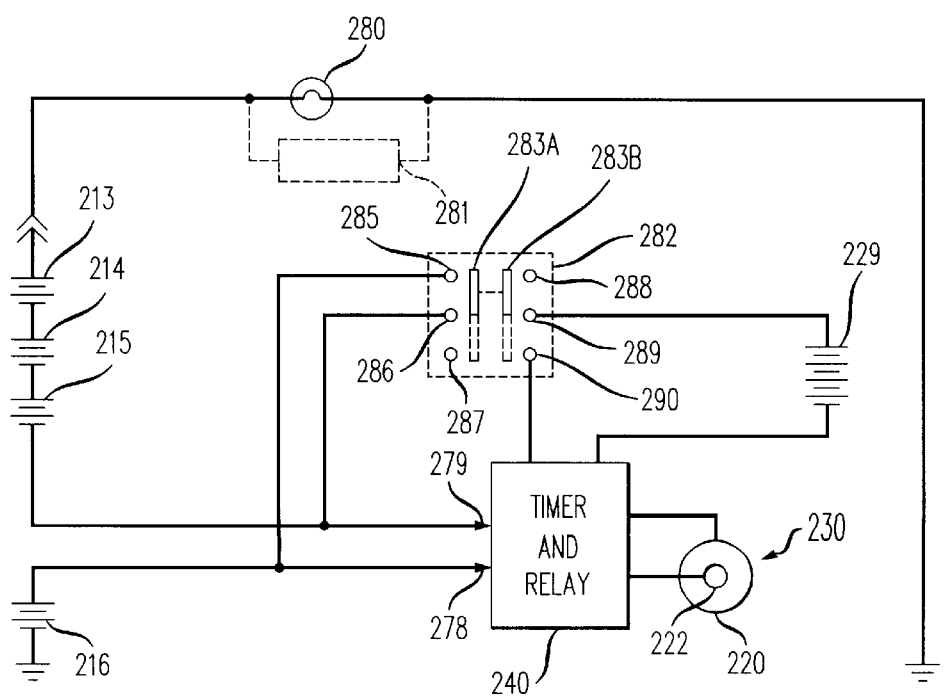
FIG. 16 sets forth a schematic diagram of an alternate electronic circuit of the present invention apparatus.

FIG. 14 sets forth a schematic diagram of timer and relay circuit 240 while FIGS. 15 and 16 set forth schematic diagrams showing the implementation of timer and relay circuit 240 within the seismically activated apparatus of the present invention.

More specifically, timer and relay circuit 240 includes a conventionally fabricated integrated circuit 260 which, in the embodiment of FIG. 14, is provided by an integrated circuit manufactured and sold by Radio Shack under the device number TLC555 (Radio Shack catalog number 276-1718). The timer integrated circuit 260 is a dual in-line package having a plurality of electrical contacts 261 through 268 disposed on opposed sides of the integrated circuit package. For convenience, the device numbers of contacts 261 through 268 (numbers 1 through 8) are maintained in FIG. 14 for ease of understanding. Circuit 240 includes a timer battery 229 coupled to terminals 264 and 268. Terminal 265 is left unconnected while terminal 261 is coupled to ground. Terminal 262 is coupled to operating supply by a resistor 272 and is coupled to contact weight 222 of seismic switch 230. Contact ring 220 of seismic switch 230 is coupled to ground. A resistor 270 is coupled between terminals 267 and 268 while a direct connection is made between terminals 266 and 267. A timing capacitor 271 is coupled between the common junction of terminals 266 and 267 and ground.

A relay 275 fabricated in accordance with conventional fabrication techniques includes a relay coil 276 coupled to a pair of diodes 273 and 274 having their respective anodes coupled to terminal 263 and ground. The remaining end of relay coil 276 is further coupled to ground. The relay contacts forming relay switch 277 activated by coil 276 are coupled to connections 278 and 279 which, as is seen in FIGS. 15 and 16, provide connection to batteries 215 and 216. Thus in the operation of timer and relay circuit 240, the activation of relay 275 operates to close or open relay switch 277 thereby either making or breaking the operative coupling between batteries 215 and 216 and thereby controls operation of the lamp within device 200 (seen in FIG. 10).

In operation, timer integrated circuit 260 remains inactive and relay switch 277 remains open in the absence of physical contact between contact weight 222 and contact ring 220. Upon the occurrence of a sufficiently dramatic seismic event, switch 230 is momentarily closed by the contact of contact weight 222 with contact ring 220. This grounds input to terminal 262 and begins a timing cycle activating timer integrated circuit 260 and energizing relay coil 276. In response, relay switch 277 closes which, as is described below in greater detail, completes the power circuit for batteries 215 and 216 to activate the lamp. Once timer integrated circuit 260 has energized coil 276, the operative voltage at terminal 263 is "latched" to maintain the energizing current for coil 276 and thereby maintain closure of relay switch 277. Thus seismic switch 230 need only make contact once to trip timer integrated circuit 260 and thereafter, in the absence of such contact, relay switch 277 is maintained in a closed condition. Timing capacitor 271 and resistor 270 are selected to provide a controlled RC time constant operative to establish a predetermined interval for latching the potential at terminal 263. Once the timing interval has passed, the latched voltage at terminal 263 is removed and relay coil 276 is deactivated thereby allowing relay switch 277 to return to its normally opened position.

FIG. 15 sets forth a circuit diagram showing the operation of timer and relay circuit 240 within apparatus 200. As described above, apparatus 200 includes a plurality of batteries 213, 214, 215 and 216 arranged in series connection. In further accordance with the present invention, however, the positive terminal of battery 216 and the negative terminal of battery 215 are coupled to timer and relay circuit 240 at terminals 278 and 279. The positive terminal of battery 213 is coupled to a lamp 280 through a switch 291. Lamp 280 is further coupled to ground. Timer and relay circuit 240 is coupled to switch 291. A timer battery 229 has a positive terminal coupled to switch 291 and a negative terminal coupled to timer and relay circuit 240. Seismic switch 230 having contact weight 222 and contact ring 220 is coupled to timer and relay circuit 240. The negative terminal of battery 229 is isolated from the negative terminal of batteries 213, 214, 215 and 216 and is an independent supply for the power needs of timer and relay circuit 240. Thus, single pole single throw switch 291 switches two power sources. This avoids the need for additional switching.

In operation, the response of the circuit of FIG. 15 to seismic activity is determined by the condition of switch 291. With switch 291 in the open position shown, the coupling of timer battery supply 229 to timer and relay circuit 240 is opened and the timer and relay circuit is inoperative notwithstanding the contact between contact weight 222 and contact ring 220. Further, in the absence of activity by timer and relay circuit 240, batteries 215 and 216 remained decoupled and thus no power is available for lamp 280. In essence, switch 291 operates to turn off the entire system.

In contrast with switch 291 closed, timer and relay circuit 240 receives operative power from battery supply 229. In the absence of seismic activity sufficient to trip switch 230, however, the relay within timer and relay circuit 240 remains open decoupling batteries 215 and 216 and causing lamp 280 to remain inactive. Once a seismic disturbance sufficient to move contact weight 222 against contact ring 220 occurs, the above described relay coupling occurs between terminals 278 and 279 of timer and relay circuit 240 thereby placing batteries 215 and 216 in series coupling with batteries 213 and 214. Under these conditions, power flows through lamp 280 so long as timer and relay circuit 240 maintains the relay connection. Once the above described timing interval has passed, the coupling of terminals 278 and 279 is interrupted and lamp 280 is again inactive.

FIG. 16 sets forth a schematic diagram of a similarly operative system in accordance with the present invention which utilizes timer and relay circuit 240. As described above, timer and relay circuit 240 is coupled to seismic switch 230 having contact weight 222 and contact ring 220. As is also described above, the apparatus includes batteries 213, 214, 215 and 216 in series connection with the connection between batteries 215 and 216 being provided through the relay of timer and relay circuit 240 via terminals 278 and 279. In the circuit of FIG. 16, lamp 280 is coupled between the positive terminal of battery 213 and ground. In further distinction from the circuit of FIG. 15, the circuit of FIG. 16 includes a double pole, double throw switch 282 having contacts 285 through 290 and sliding contacts 283A and 283B. Contacts 285 and 286 are coupled to terminals 278 and 279, respectively, while contacts 287 and 288 remain unconnected. Contact 289 is coupled to the positive terminal of battery 229 while contact 290 is coupled to timer and relay circuit 240. Switch 282 is a "center off" device so named because sliding contacts 283A and 283B may be moved to a centered position in which no connection between contacts is made.

The important distinction of the circuit of FIG. 16 is the operation of the timer and relay circuit in either of two selected modes which are determined by the position of switch 282 or inactive when turned off. With switch 282 positioned as shown, contacts 285 and 286 are coupled causing batteries 215 and 216 to be connected and allowing current flow through lamp 280 thereby operating the battery powered apparatus in a normal "flashlight" operation. In this position, contacts 289 and 290 are open and thus timer and relay circuit 240 is unpowered making the device essentially non responsive to seismic activity. Conversely, with slides 283A and 283B positioned as shown in dashed line representation, contacts 285 and 286 are open while contacts 289 and 290 are closed coupling battery supply 229 to timer and relay circuit 240. In this configuration, the apparatus is configured in a seismically responsive mode in that no connection is made between batteries 215 and 216 in the absence of activation of timer and relay circuit 240. Battery power 229 having been applied to timer and relay circuit 240, the connection between terminals 278 and 279 is determined entirely by the occurrence of activation of seismic switch 230 in the manner described above in FIG. 15. Thus the embodiment shown in FIG. 16 is operative either in a standard flashlight mode insensitive to seismic events or a seismically responsive mode responding solely to such events. The circuit of FIG. 16 may further provide an optional auxiliary device connection such as optional device 281 which may, for example, be a relay operative when lamp 280 is energized.

As can be seen in examining the operation of FIGS. 14 through 16, the sensitivity of seismic switch 230 is extremely important to the operating characteristics of the timer and relay circuit. Accordingly, returning temporarily to FIG. 12, it will be noted that an aperture 236 is formed in housing 212 of battery pack 210 which facilitates the insertion of a suitable tool such as a screwdriver or the like to loosen set screw 228 within contact weight 222 and adjust the position of contact weight 229 and thereby allow the sensitivity of the device to be adjusted. It will be further noted that the embodiments of FIGS. 15 and 16 both facilitate the transportation of the seismically responsive apparatus in an off position which avoids unintended activation and power depletion which would otherwise occur as the device is jostled or bumped when traveling. It will be further noted that the embodiment of FIG. 16 facilitates the operation of the apparatus in a standard, non seismically responsive manner which avoids depleting the energy within timer battery supply 229.

What has been shown is a seismically activated apparatus which, in various ways, accommodates the need for replacing a conventional battery cell or conventional multi-cell battery pack with a seismically responsive power pack to produce a seismically responsive operation. The device shown is relatively simple to manufacture and inexpensive to fabricate.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A portable battery-powered apparatus having means for receiving a first battery power supply having plurality of batteries and an electrically powered device and a seismically activated apparatus, said seismically activated apparatus comprising:

a housing for supporting and electrically connecting said first battery power supply;

a seismic switch having a contact weight, a contact ring defining an aperture and a spring rod resiliently supporting said contact weight within said aperture so as to be operative in first or second opposite vertically oriented positions;

coupling means including a timer responsive to said seismic switch to couple said first battery power supply to said electrically powered device;

a second battery power supply operatively coupled to said timer; and a switch operatively controlling and connecting said first battery power supply to said electrically powered device and operatively controlling and connecting said second battery power supply to said timer.

2. The portable battery-powered apparatus set forth in claim 1 wherein said spring rod is an elongated rod having a lower end and wherein said contact weight defines a center bore receiving said lower end of said elongated rod.

3. The portable battery-powered apparatus set forth in claim 2 wherein said contact weight defines a transverse threaded bore and wherein said contact weight further includes a threaded fastener received within said threaded bore in contact with said lower end of said elongated rod to secure said contact weight upon said elongated rod.

4. The portable battery-powered apparatus set forth in claim 2 wherein said seismic switch further includes a rigid rod extending from said spring rod and wherein said contact weight defines a center bore receiving said rigid rod.

5. The portable battery-powered apparatus set forth in claim 4 wherein said contact weight defines a threaded bore and wherein said contact weight further includes a threaded fastener received within said threaded bore in contact with said elongated rod to secure said contact weight upon said rod.

6. The portable battery-powered apparatus set forth in claim 5 wherein said contact ring includes a conical spring defining a center volume into which a portion of said contact weight extends.

7. The portable battery-powered apparatus set forth in claim 6 wherein said conical spring is tapered outwardly from bottom to top.

8. The portable battery-powered apparatus set forth in claim 4 wherein said housing defines an exterior shape and size corresponding generally to a standard battery and includes opposed ends and a positive and a negative battery terminal on said ends.

9. The portable battery-powered apparatus set forth in claim 4 wherein said housing defines a plurality of battery-receiving spaces and wherein said seismic switch is supported within one of said battery-receiving spaces in place of one of said batteries.

10. The portable battery-powered apparatus set forth in claim 2 wherein said elongated rod is formed of a resilient coil spring rod.

11. The portable battery-powered apparatus set forth in claim 10 wherein said contact weight defines a threaded bore and wherein said contact weight further includes a threaded fastener received within said threaded bore in contact with said coil spring rod to adjustably secure said contact weight upon said coil spring rod.

12. The portable battery-powered apparatus set forth in claim 11 wherein said coil spring rod is hollow and wherein said seismic switch further includes a dampening weight received within said coil spring rod.

13. The portable battery-powered apparatus set forth in claim 2 wherein said coupling means includes a silicon controlled rectifier having an anode and a cathode connected in series with said batteries and a gate electrode coupled to said anode by said seismic switch.

14. The portable battery-powered apparatus set forth in claim 1 wherein said electrically powered device includes an electric lamp.

* * * * *